(12) United States Patent
Yang et al.

(10) Patent No.: US 6,729,163 B2
(45) Date of Patent: May 4, 2004

(54) APPARATUS FOR OVER-CLADDING LARGE DIAMETER OPTICAL FIBER PRE-FORM USING THE SAME

(75) Inventors: Jin-Seong Yang, Kumi-shi (KR); Mun-Hyun Do, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 09/734,124

(22) Filed: Dec. 11, 2000

(65) Prior Publication Data

US 2001/0015081 A1 Aug. 23, 2001

(30) Foreign Application Priority Data

Dec. 10, 1999 (KR) .................... P1999-56746

(51) Int. Cl.[7] .................... C03B 37/02; F23D 14/12
(52) U.S. Cl. .................... 65/501; 65/529; 431/278; 431/281; 431/328
(58) Field of Search .................... 65/412, 419, 271, 65/292, DIG. 9, 428, 507, 529, 530, 531, 522, 523, 528, 501; 431/278, 280, 281, 354, 326, 328

(56) References Cited

U.S. PATENT DOCUMENTS

| 3,656,925 A | * | 4/1972 | Dunlap ........................ 65/36 |
|---|---|---|---|
| 4,148,621 A | * | 4/1979 | Gliemeroth .................... 65/417 |
| 4,231,777 A | | 11/1980 | Lynch et al. |
| 4,251,251 A | * | 2/1981 | Blankenship ................. 65/422 |
| 4,477,244 A | | 10/1984 | Nis et al. |
| 4,477,273 A | | 10/1984 | Lynch et al. |
| 4,486,214 A | | 12/1984 | Lynch et al. |
| 4,596,589 A | * | 6/1986 | Perry .......................... 65/3.12 |
| 4,645,451 A | | 2/1987 | Schneider et al. |
| 4,820,322 A | * | 4/1989 | Baumgart et al. ............. 65/412 |
| 5,169,422 A | * | 12/1992 | D'Annessa et al. ........... 65/419 |
| 5,578,106 A | * | 11/1996 | Fleming et al. ................ 65/391 |
| 5,658,363 A | * | 8/1997 | Ince et al. .................... 65/412 |
| 5,868,815 A | * | 2/1999 | DiGiovanni et al. .......... 65/382 |
| 6,145,345 A | * | 11/2000 | Marszalek et al. ............ 65/414 |
| 6,405,566 B1 | * | 6/2002 | Oh ............................... 65/412 |
| 6,460,378 B1 | * | 10/2002 | Dong et al. .................... 65/412 |
| 6,481,721 B1 | * | 11/2002 | Mueller et al. ............. 277/549 |

FOREIGN PATENT DOCUMENTS

JP 59-182243 * 10/1984

* cited by examiner

Primary Examiner—Steven P. Griffin
Assistant Examiner—Carlos Lopez
(74) Attorney, Agent, or Firm—Cha & Reiter, LLC

(57) ABSTRACT

Disclosed is a high efficiency burner and an apparatus for over-cladding an optical fiber pre-form using the same. The high efficiency burner heating an optical fiber pre-form includes burner covers, burner bodies arranged between the burner covers, and fuel dischargers arranged in at least two rows between the burner bodies, and divided by a partition, respectively.

10 Claims, 4 Drawing Sheets

APPARATUS FOR OVER-CLADDING LARGE DIAMETER OPTICAL FIBER PRE-FORM USING THE SAME

CLAIM OF PRIORITY

This application claims priority to an application entitled "High Efficiency Burner for Over-Cladding and Apparatus For Over-Cladding Large Diameter Optical Fiber Pre-form Using The Same" filed with the Korean Industrial Property Office on Dec. 22, 1999 and there duly assigned Serial No. 99-56746.

BACKGROUND OF THE INVENTION

1. Field of the Invention

The present invention relates generally to an apparatus for fabricating an optical fiber pre-form. More particularly, the present invention relates to a high efficiency burner and an apparatus for over-cladding a large diameter optical fiber pre-form using the same, in which a first pre-form is inserted into an inside of a thick quartz tube, to be heated during an over-cladding processing.

2. Description of the Related Art

In general, an optical fiber comprises a core having a predetermined index of refraction therein, and a cladding having a refraction index lower than that of the core for making a total reflection of incident lights. A method for fabricating the optical fiber comprises the steps of fabricating an optical fiber pre-form and drawing the fabricated optical fiber into one strand of optical fiber. Thereafter, the drawn optical fiber is coated to become a complete strand of optical fiber.

On the other hand, an over-cladding or an over-jacketing process is conducted to the fabricated optical fiber pre-form to draw an optical fiber having a larger diameter. Specifically, the over-cladding or over-jacketing process is conducted to the fabricated first cylindrical optical fiber pre-form with a tubular second quartz tube, thereby completing the optical fiber pre-form having a larger diameter. Here, a chemical vapor deposition or a sol-gel process is widely used for fabricating the second quartz tube, namely a silica-based glass using a fumed silica.

The over-cladding process fabricates an optical fiber pre-form of a larger diameter by inserting a first pre-form, which is manufactured by means of chemical vapor deposition or other methods for fabricating a pre-form, into the inside of a thick quartz tube, and then heating and sealing the same with a heat source. This process enlarges the cladding layer, thereby producing a pre-form having a larger diameter promising high productivity.

The heat source heating the second quartz tube during the over-cladding of the optical fiber pre-form is generally used as a burner using hydrogen and oxygen gas.

Referring to FIG. 1, the heat source is a burner using hydrogen and oxygen gas and has a ring shape, part of which is shown.

Further, FIG. 1 is a front view illustrating an inner surface, i.e., a surface at which a flame is discharged, of the burner 130 opposite to a quartz tube. The burner 130 has burner bodies 134 between burner covers 132 with hydrogen and oxygen dischargers 136 and 138 arranged between the burner bodies 134. The hydrogen and oxygen dischargers 136 and 138 are continuously provided with hydrogen and oxygen gas, so as to heat the surface of the second quartz tube. The hydrogen discharger 136 signifies an inside of each tip 139, while the oxygen discharger 138 signifies an outside of the tip 139. In addition, hydrogen and oxygen mass flow controllers (MFC) 140 and 142 are included, respectively, in the burner 130, for controlling a mass flow of the hydrogen and oxygen gas.

Here, the larger a thickness or a scale of the over-cladding quartz tube is, the higher a required heat capacity is. If a heat is first applied to an outer surface of the quartz tube, in order to perform an over-cladding on the first pre-form with the second quartz tube, the heat is conducted to the quartz tube, converging on a predetermined region therein, whereby the hottest region, referred to as a "hot zone," is formed in the predetermined region of the quartz tube. The heat is conducted from the hot zone to an inside of the second quartz tube, which is condensed and melted into the first pre-form to produce a second pre-form. Thus, if the second quartz tube subject to the over-cladding is thick, the burner should have a size in conformity of a periphery of the second quartz tube, so as to achieve an efficient heat transfer to the inside thereof. In addition to this, a provision of a fuel such as hydrogen and oxygen gas is preferably increased to enhance a heat capacity.

However, as the quartz becomes thicker, the amount of fuel which is required is drastically increased. Further, while the heat value is focused on the hot zone, the hottest region among regions in the outer surface of the quartz tube heated by the burner and then the hot zone is condensed, even before the hot zone is not condensed, there sometimes generates an occasion, in which the surface of the quartz tube runs down due to its deterioration of viscosity. In this regard, an intensive heating on the hot zone by enhancing the amount of fuel has a limit.

Further, there is a way to extend a fuel-sprayed region for enlarging the hot zone. In this case, an equal provision of fuel such as hydrogen and oxygen gas is difficult to be achieved, thereby resulting in an irregular heat provision. As a consequence, a uniform over-cladding is not assured.

SUMMARY OF THE INVENTION

It is, therefore, an object of the present invention to provide a process for over-cladding an optical fiber pre-form, by which a double-clad structured burner is used, so as to enlarge a hot zone on an equal basis and therefore improve a thermal efficiency as well as securing a uniform and efficient over-cladding.

It is another object of the present invention to provide a process for over-cladding an optical fiber pre-form, by which an equal and highly efficient heating is applied particularly during an over-cladding of a thick quartz tube, so as to curtail the time for over-cladding, thereby serving to promote productivity.

It is further another object of the present invention to provide a process for over-cladding an optical fiber pre-form, through which a double-clad structured burner is used, so as to provide means additionally operable with a different heating value, if necessary.

It is still another object of the present invention to provide a process for over cladding an optical fiber pre-form, by which a uniform fuel provision is carried out, so as to prolong a durability of burner tips.

To achieve the above objects, there is provided a burner according to the present invention. The burner heating an optical fiber pre-form includes burner covers, burner bodies positioned between the burner covers, and fuel dischargers arranged in at least two rows between the burner bodies and divided by a partition.

Accordingly, the apparatus for over-cladding the optical fiber pre-form according to the present invention, which performs an over-cladding on an optical fiber pre-form with a quartz tube, includes: upper and lower fixing chucks mounted on upper and lower sides of a tower; a first optic fiber pre-form having a handle rod connected to one end thereof so as to be fastened to the upper and lower fixing chucks, and having a supplementary support quartz tube connected to the other end thereof so as to be fastened to the lower fixing chuck; a second quartz tube inserted into the first optic fiber pre-form; and a hydrogen and oxygen burner including fuel dischargers including an oxygen discharger and a hydrogen discharger, at least double-clad structured and divided by a partition, thereby enlarging the hot zone in the quartz tube.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail since they would obscure the invention in unnecessary detail.

Figure 1:
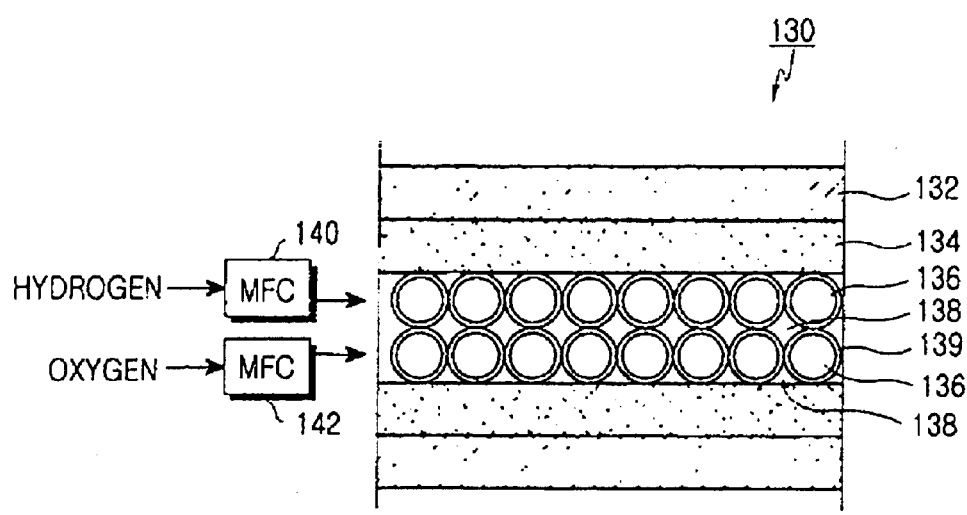
FIG. 1 is a cross-sectional view illustrating a construction of an over-cladding burner according to an embodiment of the conventional art.
Figure 2:
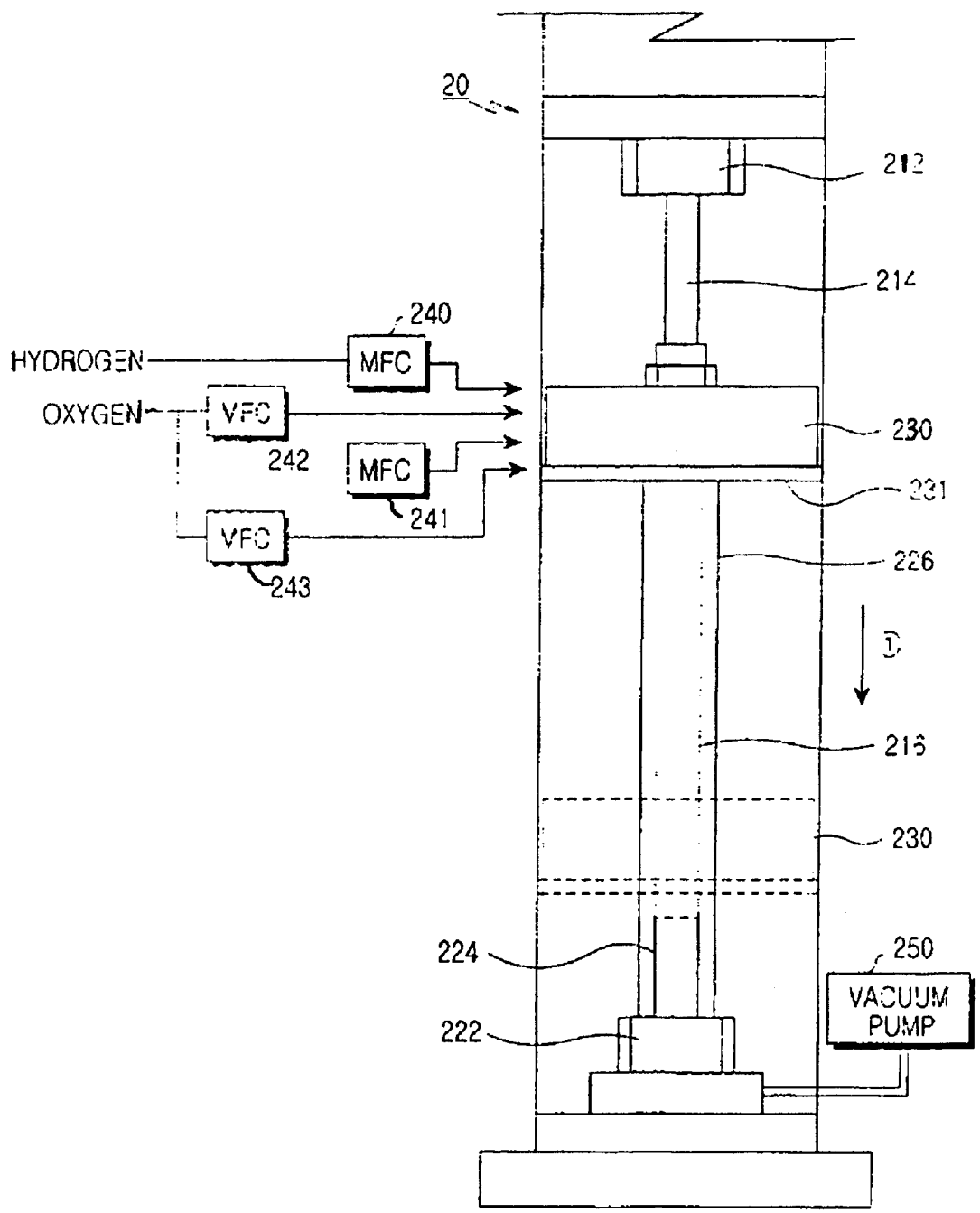
FIG. 2 is a schematic view illustrating a construction of an apparatus for over-cladding a large diameter optical fiber pre-form according to a preferred embodiment of the present invention.

An over-cladding apparatus for performing an over-cladding process according to a preferred embodiment of the present invention will be described herein below with reference to FIG. 2. Some arrangements are installed to be vertically separated from each other around the axis of a tower 20. Upper and lower fixing chucks 212 and 222, respectively, are included in the over-cladding apparatus to fix a first quartz tube as a first pre-form 216 and a second pre-form 226 comprising the collapsed second quartz tube 226 onto the first pre-form 216 after heating. The upper and lower fixing chucks fix the pre-forms around the axis at the upper and lower sides of the tower 20.

First, the first pre-form 216 having a handle rod 214 is installed by fixing the handle rod 214 to the upper chuck 212. A second quartz tube 226 having a supplementary support quartz tube 224 is installed by fixing the supplementary support quartz tube 224 at a first end to the lower fixing chuck 222. The supplementary support quartz tube 224 is fixed at a second end to the first pre-form 216. During the process, it does not matter that an installation order of the first pre-form 216 and the second quartz tube 226 is reversed.

Subsequently, an upper head stock having the first pre-form 216 or a lower tail stock having the second quartz tube 226 is vertically moved so that the first pre-form 216 is inserted into the inside of the second quartz tube 226 along the axis to a moderate deepness. Thereafter, a burner 230 as a heat source is moved to the upper side of the second quartz tube 226 to heat the surface of the second quartz tube 226. The burner is moved downward (in an arrow direction) to eliminate the gap between the first pre-form 216 and the second quartz tube 226, continuously executing the sealing as moving downward. After the sealing is completed, the accomplished second pre-form has been cut and separated from the upper and lower fixing chucks 212 and 222, finishing all operations.

Here, the larger a thickness or a scale of the over-cladding quartz tube 226 is, the higher is the required heat capacity of the burners. If heat is applied to an outer surface of the quartz tube 226, in order to perform an over-cladding on the first pre-form 216 with the second quartz tube 226, the heat is conducted to the quartz tube 226, converging on a predetermined region therein, whereby the hottest region, namely a hot zone, is formed in the predetermined region of the quartz tube. The heat is conducted from the hot zone to an inside of the second quartz tube 226, which is condensed and melted onto the first pre-form 216 to produce a second pre-form (not shown). Thus, if the second quartz tube 226 to be a subject of the over-cladding is thick, the burner should have a size in conformity of a periphery of the second quartz tube 226, so as to achieve an efficient heat transfer to the inside thereof. In addition to this, a provision of a fuel such as hydrogen and oxygen gas is preferably increased to enhance the heat capacity of the burners. In this case, a vacuum pump 250 is preferably used to improve inhalation of air, serving to enhance the heat transfer efficiency.

Figure 3:
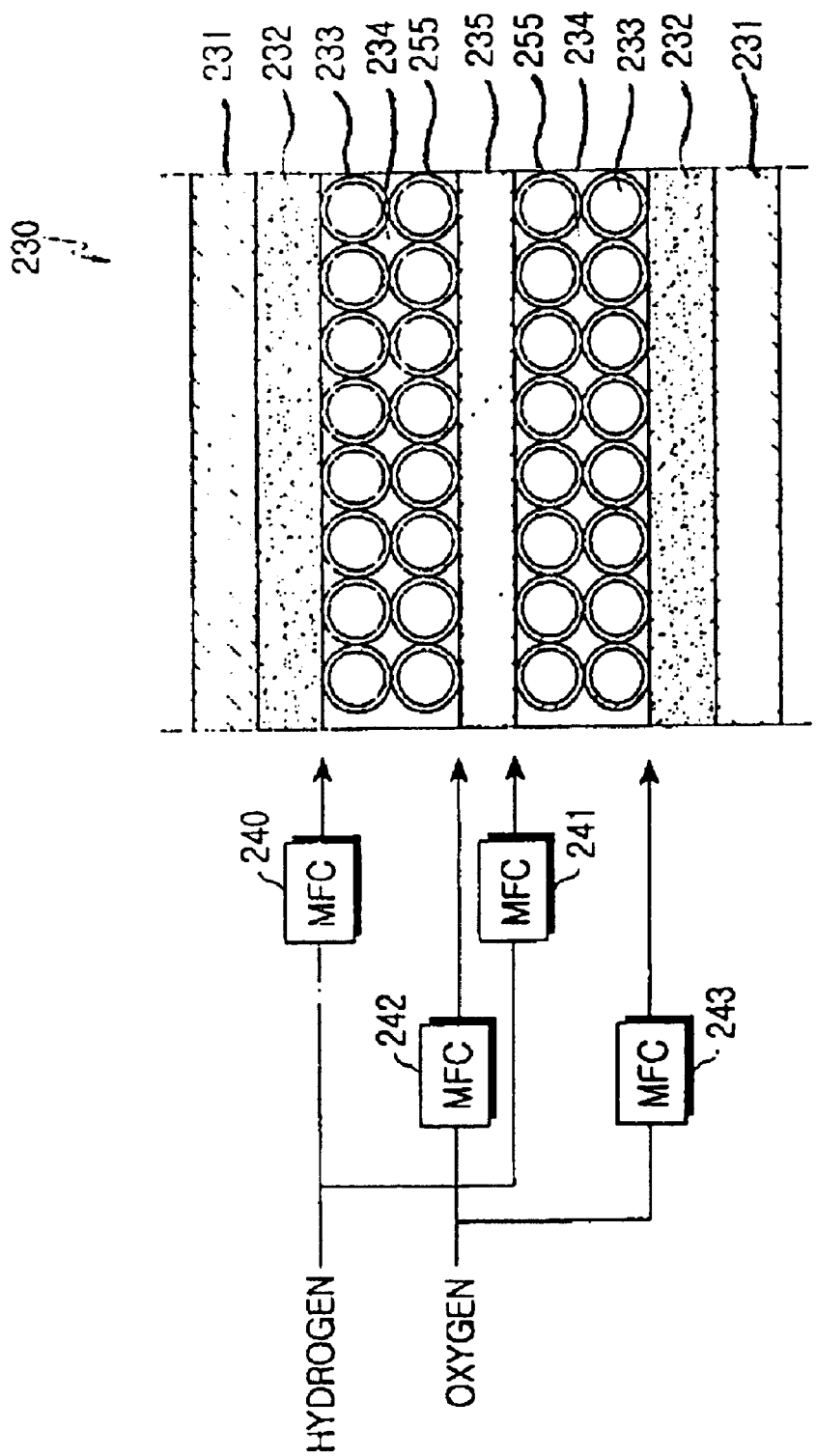
FIG. 3 is a cross-sectional view illustrating a construction of a high efficiency burner for over-cladding according to a preferred embodiment of the present invention.

Referring to FIG. 3, according to a preferred embodiment of the present invention, a burner 230 includes: a double-clad structured fuel dischargers, namely tip lines, which include an oxygen discharger 234 and a hydrogen discharger 233; pipe arrangements mounted on the respective tip lines, for providing the fuel like hydrogen and oxygen gas on an independent basis; and mass flow controllers, i.e., flow meters, installed on an independent basis, for controlling a mass flow.

More specifically, according this embodiment of the present invention, the high efficiency burner for over-cladding comprises: burner bodies 232 arranged between the upper and lower burner covers 231, respectively; tip lines 255 featured arranged in at least two rows between the burner bodies 232; and a partition 235 positioned between the tip lines 255. The hydrogen discharger 233 signifies an inside of each tip, while the oxygen discharger 234 signifies a periphery of the tip. Here, the tip lines may have hydrogen flow controllers 240 and 241 and oxygen flow controllers 242 and 243 on an independent basis. Further, the mass flow controllers are independently installed.

A stream path, through which a cooling water is possibly flowing, (not shown), may be formed in the inside of the burner bodies 232 in order to prolong a durability of the burner by absorbing the heat. Here, the mass flow controllers 240, 241, 242 and 243 are usually the most preferable elements to enable a fine control of the mass flow including gas. However, a flow meter, a valve and the like may be used in lieu of the mass flow controller to control the amount of flow.

Figure 4:
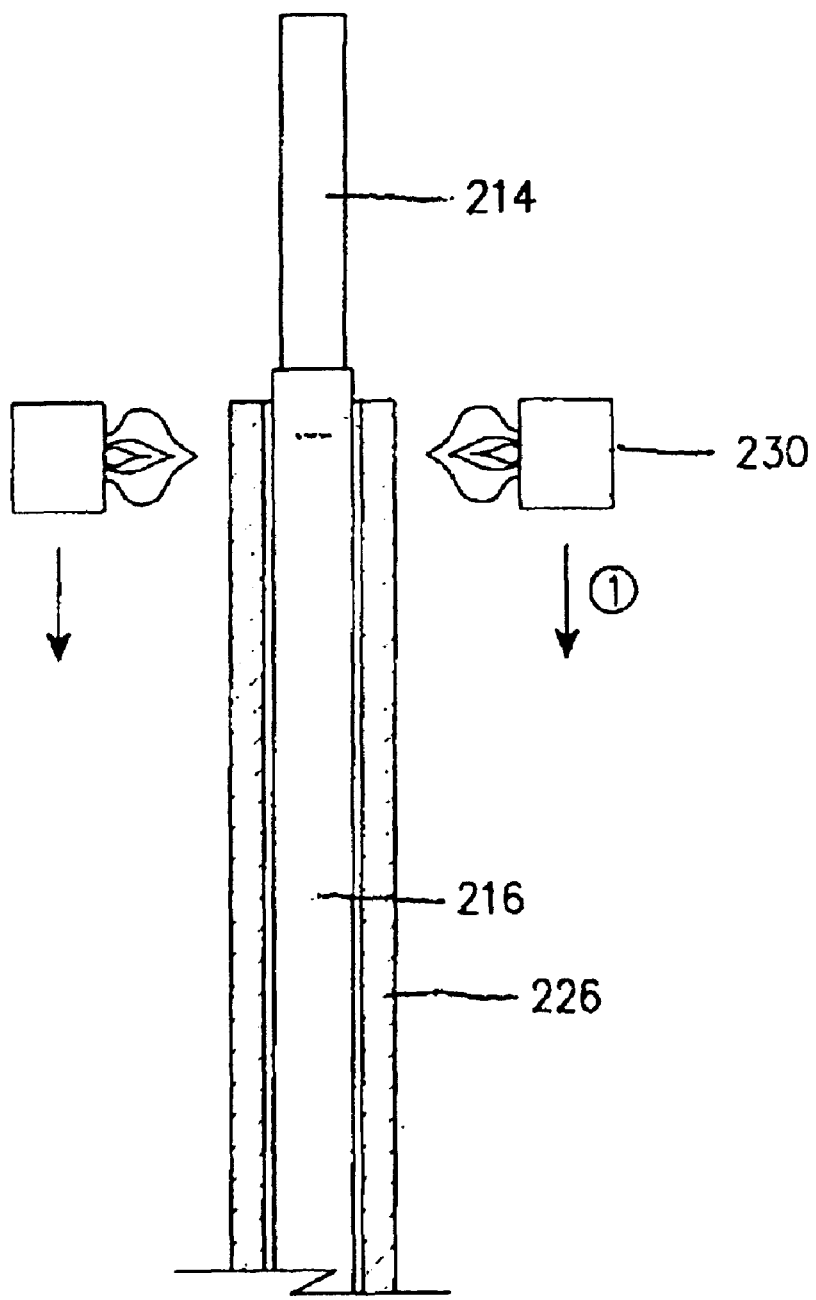
FIG. 4 is diagram illustrating an operation of a high efficiency burner for over-cladding according to a preferred embodiment of the present invention.

An operation of an over-cladding apparatus according to a preferred embodiment of the present invention will be described herein below with reference to FIG. 4. The fuel, such as oxygen and hydrogen gas, is provided through the respective independent flow controllers to upper and lower ends of burner tip lines. The provided fuel generates a flame on the upper and lower ends of the burner tip lines as well as heating and condensing the surface of a quartz tube 226. Since the fuel is provided through the respective independent tip lines, the provided flow is uniform. Since only a specific point is not heated, therefore, the hot zone may be enlarged far away on a uniform basis. The hot zone is desired to be narrow when sealing the top or cutting the bottom of the quartz tube 226. However, according to the present invention, just one of the upper and lower ends of the burner 230 needs to be used, thereby achieving an easier control of the process.

In addition, natural gas, LPG or butane gas can be also used in lieu of the hydrogen and oxygen gas considering an economic aspect. The high efficiency burner to be applied according to the present invention is not limited to the over-cladding apparatus, and is also used in fabricating the first optical fiber pre-form or drawing the optical fiber.

As described above, according to the present invention, fuel dischargers in the burner are double-clad structured having an upper side and a lower side to enable an even extending of the hot zone, to achieve a uniformity of the over-cladding as well as enhancing productivity thanks to a resultant reduction of the processing time. Further, if there is required a narrow hot zone during sealing the top or cutting the bottom of the quartz tube, one end of the burner tip lines is only used, thereby improving an easiness in the course of processing. Besides, a cooling water path may be formed between the upper and lower ends of the burner tip lines to reduce a combustibility of the burner tips due to the high temperature, and further to prolong the durability of the burner.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An apparatus for over-cladding a large diameter optical fiber pre-form, which performs an over-cladding on an optical fiber pre-form with a quartz tube, comprising:

upper and lower fixing chucks mounted on respective upper and lower sides of a tower;

a handle rod connected at a first end to the upper fixing chuck;

a first optical fiber pre-form being connected at one end to a second end of the handle rod;

a supplementary support quartz tube connected at a first end to the lower fixing chuck and a second end connected to the other end of the first optical fiber pre-form;

a second quartz tube inserted around the first optical fiber pre-form; and a burner arranged between the second end of the handle rod and the lower fixing chuck, said burner comprising at least two rows of fuel dischargers including an oxygen discharger and a hydrogen discharger, and said at least two rows of fuel dischargers being divided by a partition; wherein the burner is movable along the length of the second quartz tube, and on a respective each side of the partition a collective temperature of the rows of fuel dischargers is variably independent of the other side of the partition.

2. The apparatus as recited in claim 1, wherein a first respective end of the burner is operable in a hot zone when sealing a top or cutting a bottom of the second quartz tube, whereas a second respective end is off.

3. The apparatus according to claim 1, wherein each row of fuel dischargers includes an individual mass flow controller.

4. The apparatus as recited in claim 3, wherein the individual mass flow controllers are operable on an independent basis, respectively.

5. The apparatus recited in claim 3, wherein the individual mass flow controllers are flow meters.

6. The apparatus according to claim 1, wherein the burner includes burners bodies arranged between burner covers, said burner bodies are operable independently of each other.

7. The apparatus according to claim 1, further comprising mass flow controllers for controlling a flow of gas to each respective row of said fuel dischargers.

8. The apparatus according to claim 7, wherein each individual mass flow controller is operable independently.

9. The apparatus of claim 7, wherein the mass flow of gas is oxygen and hydrogen gas.

10. The apparatus of claim 7, wherein the mass flow of gas is LPG or butane gas.

* * * * *